(12) United States Patent
Gniatczyk et al.

(10) Patent No.: US 6,309,587 B1
(45) Date of Patent: Oct. 30, 2001

(54) COMPOSITE MOLDING TOOLS AND PARTS AND PROCESSES OF FORMING MOLDING TOOLS

(76) Inventors: Jeffrey L. Gniatczyk, 37419 Fiore Trail, Clinton Township, MI (US) 48036; George R. Aquilina, 29919 Great Mack, St. Clair Shores, MI (US) 48082; Dann T. Deaver, deceased, late of Saint Clair Shores, MI (US); by Dann C. Deaver, personal representative, 33030 Jefferson St., Saint Clair Shores, MI (US) 48082

( * ) Notice: Subject to any disclaimer, the term of this patent is extended or adjusted under 35 U.S.C. 154(b) by 0 days.

(21) Appl. No.: 09/374,330

(22) Filed: Aug. 13, 1999

(51) Int. Cl.[7] .................................................. B29C 33/38
(52) U.S. Cl. ..................... 264/510; 249/80; 249/114.1; 249/134; 264/219; 264/225; 264/571
(58) Field of Search ................................ 249/80, 114.1, 249/134; 264/219, 225, 510, 571; 106/38.2, 38.22; 428/220, 221

(56) References Cited

U.S. PATENT DOCUMENTS

| | | |
|---|---|---|
| 2,750,632 | 1/1956 | Kish . |
| 2,822,448 | 2/1958 | Wegmann . |
| 3,153,915 | 10/1964 | Deith . |
| 3,231,341 | 1/1966 | Sump et al. . |
| 3,292,894 | 12/1966 | Falkenau . |
| 3,386,503 | 6/1968 | Corning et al. . |
| 3,410,936 * | 11/1968 | Juras . |
| 3,464,854 | 9/1969 | Bolger . |
| 3,607,569 | 9/1971 | Greenwell . |
| 3,622,659 | 11/1971 | Sonia et al. . |
| 3,635,623 | 1/1972 | Olson et al. . |
| 3,645,899 | 2/1972 | Linson . |
| 3,838,094 | 9/1974 | Sporck . |
| 3,895,162 | 7/1975 | Lemont et al. . |
| 3,904,555 | 9/1975 | Matsuda et al. . |
| 4,038,444 | 7/1977 | Steinhauser et al. . |
| 4,049,767 | 9/1977 | Vaidya . |
| 4,073,049 * | 2/1978 | Lint ..................................... 264/219 |
| 4,102,851 | 7/1978 | Luck et al. . |
| 4,105,184 | 8/1978 | Sumitomo . |
| 4,125,351 * | 11/1978 | Alfter et al. ......................... 249/134 |
| 4,146,565 | 3/1979 | Quraishi . |
| 4,287,115 | 9/1981 | Legler . |
| 4,307,147 | 12/1981 | Ohishi et al. . |
| 4,356,233 | 10/1982 | Lange et al. . |
| 4,366,185 | 12/1982 | Tanaka et al. . |
| 4,375,498 | 3/1983 | Le Minez et al. . |
| 4,394,340 | 7/1983 | Tarumi et al. . |
| 4,423,094 | 12/1983 | Dearlove et al. . |
| 4,459,335 | 7/1984 | Tanaka et al. . |
| 4,528,305 | 7/1985 | Henry . |
| 4,533,685 | 8/1985 | Hudgin et al. . |
| 4,546,674 | 10/1985 | Clark et al. . |
| 4,601,867 | 7/1986 | Martell et al. . |
| 4,654,382 | 3/1987 | Hiza et al. . |
| 4,670,485 | 6/1987 | Hesse et al. . |
| 4,681,904 | 7/1987 | Yasuda et al. . |
| 4,732,962 | 3/1988 | Atkins et al. . |
| 4,830,779 | 5/1989 | Maeno et al. . |
| 4,859,528 | 8/1989 | Lee et al. . |
| 4,920,161 | 4/1990 | Wang et al. . |
| 4,925,886 | 5/1990 | Atkins et al. . |
| 4,940,629 | 7/1990 | Weber et al. . |
| 4,980,112 | 12/1990 | Masters . |
| 5,053,476 | 10/1991 | Akutagawa et al. . |

(List continued on next page.)

*Primary Examiner*—James P. Mackey
(74) *Attorney, Agent, or Firm*—Harness, Dickey & Pierce, P.L.C.

(57) ABSTRACT

The present invention provides a composite molding tool including a surface coat that comprises metal powders and mineral fillers, and a composition comprising a resin mixture and metallic fillers. The composition includes at least about 45% metallic fillers, based on the weight percent of the total composition.

13 Claims, 11 Drawing Sheets

U.S. PATENT DOCUMENTS

| | | |
|---|---|---|
| 5,057,256 | 10/1991 | Gorin . |
| 5,073,589 | 12/1991 | Milovich et al. . |
| 5,096,762 | 3/1992 | Yoshida et al. . |
| 5,202,753 | 4/1993 | Shintai . |
| 5,226,210 * | 7/1993 | Koskenmaki et al. . |
| 5,261,993 | 11/1993 | Dahlgren . |
| 5,281,634 | 1/1994 | Hesse et al. . |
| 5,298,548 | 3/1994 | Shiobara et al. . |
| 5,302,107 | 4/1994 | Dahlgren . |
| 5,319,003 | 6/1994 | Gomez et al. . |
| 5,358,211 | 10/1994 | Sterett . |
| 5,470,651 | 11/1995 | Milinkovic et al. . |
| 5,691,402 | 11/1997 | Anders . |
| 5,746,966 | 5/1998 | McDonald . |
| 5,783,259 | 7/1998 | McDonald . |
| 5,832,981 | 11/1998 | McDonald et al. . |

* cited by examiner

COMPOSITE MOLDING TOOLS AND PARTS AND PROCESSES OF FORMING MOLDING TOOLS

BACKGROUND OF THE INVENTION

1. Field of the Invention

The present invention relates generally to a composite molding tool, and a process of forming a tool and, more particularly, to a high metallic composite molding tool and composite parts formed by compression.

2. Discussion of the Related Art

Generally, plastic molding tools are known in the art and can be used to produce, for example, automobile parts. It has also been recognized that the use of metal or metal radiating wires within the molding tool composition increases heat conduction from within the tool during a molding process. See, e.g., U.S. Pat. Nos. 4,105,184 and 4,980,112, hereby incorporated by reference. These patents do not, however, teach the use of pressure to compress the plastic and metal content, thereby maximizing the use of metal and minimizing the use of plastic to accomplish more uniform, efficient heat conduction throughout the molding tool. Moreover, U.S. Pat. No. 4,105,184 discloses the use of radiating wires, resulting in an uneven distribution of the wire and little thermal conductivity. Therefore, there also does not exist a process for forming a molding tool under high pressure that has an increased dense metallic content as compared to the resin content, resulting in a tool having an improved thermal and electrical conductivity.

There thus exists a need in the art to provide a composite molding tool and process of making a tool which has a high metal density and heat capacity. This is done in the present invention by forming the tool under increased pressure and temperature and by utilizing preselected forms and quantities of metal content.

SUMMARY OF THE INVENTION

The present invention provides a composite molding tool for molding thermoplastic and thermoset resins into, for example, automobile parts. The completed molding tool comprises a surface coat that includes metal powders and mineral fillers, and a composition comprising a resin mixture and metallic fillers, the composition including at least about 45% metallic fillers, based on the weight percent of the total composition.

The present invention also provides a composite part comprising a composition that includes a resin mixture and metallic fillers, where the composition includes at least about 45% metallic fillers, based on the weight percent of the total composition.

The present invention further provides a process of forming such composite molding tools comprising applying at least one layer of a surface coating mixture to a model, producing a surface coat. At least one layer of metal wool saturated in a resin coating mixture is then applied to the surface coat, producing a metal wool/resin mixture layer. Pressure, such as by a vacuum bag system, is also applied to the metal wool/resin mixture layer, compressing the layer and drawing out excess resin mixture and air pockets.

The present invention further provides a process of forming composite molding tools comprising providing a model having a surface for forming the composite molding tools, and applying a surface coating mixture layer to the model, producing a surface coat. A second coating of surface coating mixture is applied to the surface coat, and at least one layer of metal wool saturated in the resin coating mixture is applied to the second coating of surface coating mixture, producing a metal wool/resin mixture layer.

The process also includes applying pressure, such as with a vacuum bag system at room temperature, to the metal wool/resin mixture layer, compressing the metal wool/resin mixture layers and drawing out excess resin mixture and any voids or air pockets. In one embodiment, the composite molding tool is then placed in an autoclave, where further pressure is applied to compress the wool/resin mixture layer. Autoclaving is generally employed where the molding tool requires increased density, such as molding tools for injection molding, blow molding, and compression molding. The vacuum bag system is then removed, exposing a back surface of the molding tool, and a cooling system comprising copper tubing is fitted to the back surface. At least one layer of a conductive aluminum slurry mixture is then applied to the copper tubing system.

A chase or perimeter wall is constructed and attached to the back surface, where the chase is cross-braced with an eggcrate structure within the perimeter of the chase. The eggcrate structure is made of plywood, welded aluminum sheet, steel sheet, composite board, aluminum/epoxy cell panel or cast aluminum armature. Finally, the back surface and eggcrates are filled with a resin mixture, resulting in one half of the composite molding tool being formed. A second half of said composite molding tool is constructed, for example, by repeating each of these steps. Alternatively, the corresponding halves may be different shapes and sizes from one another depending on the part being molded and the process being employed.

DETAILED DESCRIPTION OF THE PREFERRED EMBODIMENT(S)

The following description of the preferred embodiments is mainly exemplary in nature and is in no way intended to limit the invention or its application or uses.

The process of the present invention provides a composite molding tool having a high thermal and electrical conductivity, and a high temperature resistance. The composite molding tool is formed with compressed metal wool wire. The close proximity of the wool wire provides a molding tool with uniform and increased strength and conductivity. In a preferred embodiment, the present invention molding tool includes about 45 to 90% metallic fillers, including the metal wool wire. In another preferred embodiment, the molding tool has about 60 to 80% metallic fillers.

The process of forming the molding tool also provides machinability ease and the ability to reproduce texture or achieve a high gloss surface on the molding tool. In addition, the process uses low cost materials, requires a low labor content, and has a short mold or tool production time.

The present invention process for forming a composite tool requires between about two to four layers of surface coat and saturated metal wool, whereas most conventional composite tools require lamination of about eight to ten layers of epoxy and fiberglass. These type of prior art tools also have very low thermal conductivity, unlike the present invention. The advantage of increased thermal conductivity in the present invention is the management of heat that is put in the mold during the molding of a plastic part. The heat originates from the molten plastic for thermoplastics, and from the exotherm created by the chemical reaction occurring in the molding of thermoset plastics. The present molds conduct the heat away from the molded plastic part, as the plastic part being molded cannot be demolded if it is too hot or it will distort from lack of strength. This results in the present process having faster molding cycles than the prior art.

The present invention also discloses a composite part comprising a composition that includes a resin mixture and metallic fillers, where the composition includes at least about 45% metallic fillers, based on the weight percent of the total composition, but may include up to about 90% metallic fillers. In a preferred embodiment, the present invention composite part includes about 60 to 80% metallic fillers, and 20 to 40% of a resin mixture.

The composite part, however, does not include any surface coat layers or backing structure, as in the present invention composite molding tool. The composite part may be any part, such as a paint fixture, airplane part or tooling slab. The composite part paint fixture may be used for electrostatic spray painting, where the paint contains charged particles and is applied to a molded plastic part containing enough metal particulate to carry a low current. The part to be painted rests on the fixture and passes the current onto the fixture. The fixture grounds the part through the steel conveyor system to which the fixture is mounted. The sprayed paint is uniformly attracted to the plastic part, minimizing paint waste and emission of harmful VOCs.

In one embodiment, the composite part may be produced by compression molding employing the present invention composite molding tool. Alternatively, the vacuum bagging/ autoclaving system may be used, although the system is not always required or possible if the part to be molded is a complex part. An additional alternate embodiment for forming composite parts is to employ a rubber bladder across the top of the material to be compressed. A high positive pressure is then applied to the bladder, pushing the bladder down onto the molding material. The rubber bladder forms around the molding material, resulting in a dense, thermally conductive metallic part.

The composite molding tool, part, and process of the present invention accomplishes these goals by combining a resin mixture with metal wool under pressure being applied via an enclosed vacuum of negative pressure, and in some instances, also in a positive pressure environment such as in a pressure chamber or an autoclave system, to provide a dense, compressed composite tool devoid of air pockets and with a minimum resin content. The use of a minimum resin content in the finally formed lamination results in a molding tool having improved strength, conductivity, and heat capacity. The use of cooling tubes, such as copper or stainless steel tubes, in some applications also improves the strength of the molding tool.

An improved density for a molding tool or molded part of the present invention is achieved by the use of a high metal content made possible by compressing metal wool. Compressing the metal wool leaves less space between individual metal wires of the wool for the resin mixture. The resin mixture functions to bond the metal wires in place, and an optimum resin mixture to metal wool ratio for each type of wool, such as aluminum or steel, exists. For aluminum wool, the ratio is preferably 6.5 parts structural laminating composite to 1 part wool. For steel, the ratio is preferably 4.5 parts structural laminating composite to 1 part wool. Additionally, autoclaving results in a mold having an even greater density because the increased pressures further reduce the resin content, compressing the metal wool and producing an increased weight to volume ratio of metal.

Figure 1:
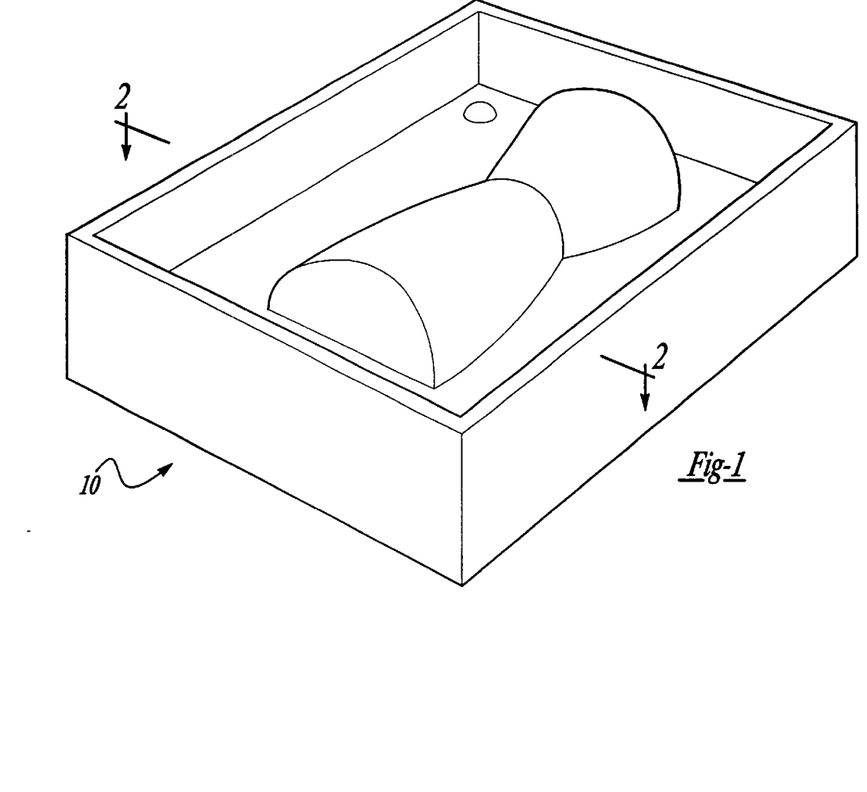
FIG. 1 is a perspective view of a model used for forming the molding tool in accordance with the present invention.
Figure 2:
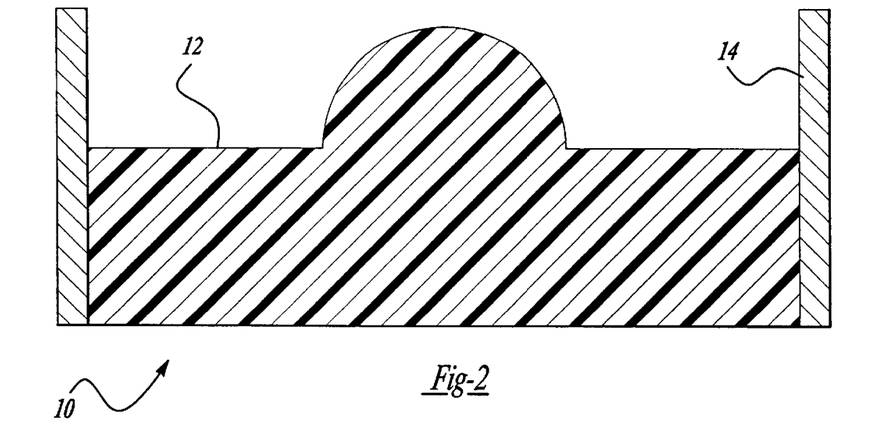
FIG. 2 is a cross-section view of the model of FIG. 1.

FIG. 1 provides a perspective view of a model 10 used for forming the molding tool in accordance with the present invention. Referring to FIG. 2, the present invention utilizes, by way of example, model 10 for forming a plastic molding tool for making parts out of plastic material. The tools made according to the processes of the present invention are cast or laminated over a model such as model 10. Model 10 is preferably constructed of, but not limited to, wood, thermoset and thermoplastic resins, and/or wax. In a preferred embodiment, model 10 has a run-off 12 in order to provide the molding tool with face kiss on a mating mold half. The run-off is the surface defining the area of kiss-off, or the area of interface between the two mold halves from the edge of the mold cavity to the exterior walls of the mold. Model 10 includes a return flange wall 14 around its perimeter, adjacent to run-off 12. This allows the tool produced according to the processes of the present invention to have a 90° return flange, which in the example shown, may be a flange of approximately three to four inches in length.

In a preferred embodiment, model 10 is first waxed with a pattern makers sheet wax known in the art and sprayed with a commercial parting agent, such as polyvinyl alcohol. Allowances traditionally should be made for shrinkage in the material used to form the molding tool and the part to be formed by the mold when choosing the appropriate size of the model. In the present invention, the composition and forming processes may provide a low rate of shrinkage for the molding tool, approximately 0.0008 to 0.0011 in/in for an aluminum system, and minimal shrinkage for an iron system after the first heat history. Once the iron system is exposed to temperatures over 75° F., it appears to shrink about 0.0005 to 0.0007 in/in. It is the resin mixture component of the composite mold that shrinks, and therefore, the use of less resin is desirable.

Figure 3:
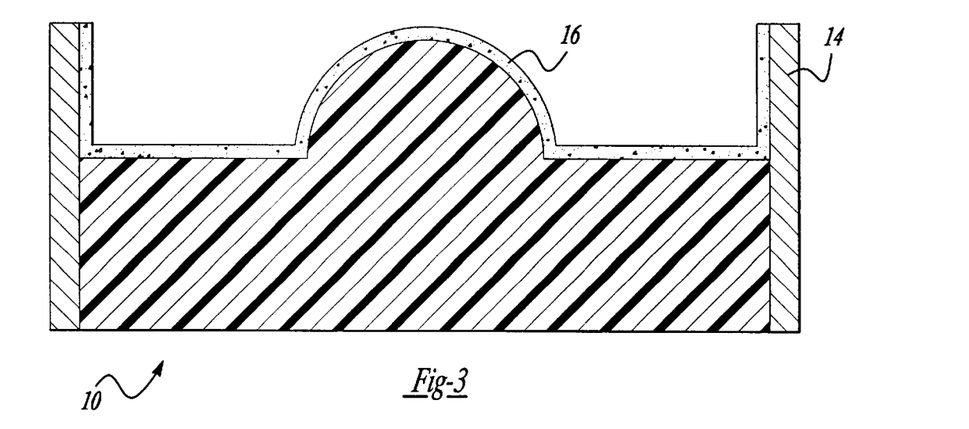
FIG. 3 is the model of FIG. 2 with a surface coat layer.

Referring now to FIG. 3, a surface coat or layer 16 is applied to the surface of model 10, after the parting agent has completely dried. The composition of surface coat 16 is preferably made up of a combination of a resin mixture including thermoset resin, a promoter, mineral fillers, a catalyst, an inhibitor, and metal powder fillers. In a preferred embodiment, the thermoset resin may be a vinyl ester, non-styrenated vinyl ester, epoxy, polyurethane, polyester, or silicone RTV. Preferably, the thermoset resin is a non-styrenated vinyl ester (VESTALLOY®, Lenox Resources Ltd.) because of its high heat capability and the ability to produce a molding tool with greater surface hardness as a result of the surface coat.

The metal powders or particulates of the surface coat are preferably aluminum or iron, and the mineral fillers are barium sulfate or milled carbon fibers (Grafil). The promoter is preferably, but not limited to, cobalt. Preferred catalysts to be used in the process of the present invention are cumene hydro peroxide (CHP) or Mekp Hipoint 90. The inhibitor is preferably p-tert-butylcatechol (TBC).

In an alternate embodiment of the present invention, the surface coat of the molding tool may further include molybdenum when molding DCPD (dicyclopentadiene) materials. As is known in the industry, hydrochloric acid is released as a by-product when molding DCPD materials, corroding the surface of the molding tools. The use of molybdenum in the surface coat protects the surface of the tool against corrosion and etching by acidic materials.

Surface coat 16 is preferably applied to the surface of model 10 at a thickness of approximately 0.025 to 0.030 inches, and contains a high percentage of metallic particulates and powder fillers, such as about 60 to 90% by weight, in order to provide a tool with a high surface hardness. The surface coat is preferably formulated to have a viscosity of approximately 75,000 to 126,000 CPS (Brookfield Spindle 7) at room temperature, providing adhesion and cohesion on a vertical surface of a model. After application, surface coat 16 is allowed to gel, preferably being catalyzed for approximately 45 minutes at room temperature (75° F.).

In a preferred embodiment, the molding tool of the present invention has a surface hardness of at least about 85 to 95 Shore D at 72° F., about 80 to 90 Shore D at 250° F., and about 75 to 85 Shore D at 400° F. The surface coat described herein may be employed with both iron and aluminum systems, resulting in a surface coat that has increased impact capabilities, heat transfer, and elevated temperature hardness.

A resin mixture of thermoset resin, promoter, metal particulate and powder fillers, mineral fillers, inhibitor and catalyst is then applied to surface coat 16 after the surface coat has gelled, resulting in an intermediate resin layer 17 (not shown) of about 0.030 inches. In a preferred embodiment, the resin mixture is an aluminum mixture or structural laminating composite (SLC) comprising about 45.0% by weight of a thermoset resin and about 55.0% by weight of aluminum powder. In another preferred embodiment, the resin mixture is an iron mixture or structural laminating composite (SLC) comprising about 32.0% by weight of a thermoset resin, 66.0% by weight of aluminum powder, and about 2.0% by weight of glass fiber (1/32 inches). In some tooling applications, wollastonite or calcium metasilicate may be added to the resin mixture. Wollastonite is a naturally occurring mineral.

Figure 4:
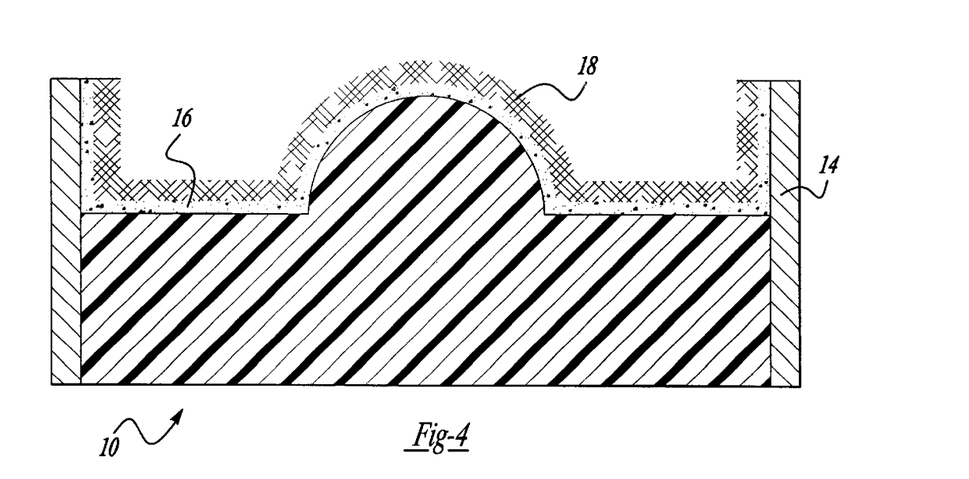
FIG. 4 is the model of FIG. 3 with a resin saturated metal wool layer.

Prior to curing of the surface coat and intermediate layers 16 and 17, a sheet of metal wool 18, which has been saturated in the above-mentioned resin mixture, is also applied to the intermediate layer 17, as shown in FIG. 4. Run-off 12 and return flange wall 14 are also covered with the surface coat 16, intermediate layer 17, and resin saturated metal wool layer 18. More than one metal wool layer 18 may be applied depending on the type of tool being produced by the present process. In a preferred embodiment, the resin mixture employed is formulated for about a 40 minute to 3 hour gel time at 75° F., depending on the tool size. The iron resin mixture is preferably formulated to have a viscosity of approximately 12,000 to 25,000 CPS (Brookfield Spindle 7) at room temperature, while the aluminum resin mixture is preferably formulated to have a viscosity of approximately 25,000 to 75,000 CPS (Brookfield Spindle 7) at room temperature.

In one embodiment, a third surface coat layer 27 (not shown) may also be applied to intermediate layer 17. Surface coat layer 27 is formulated to have a longer gel and cure time than layers 16 and 17 in order to provide increased mechanical bonding between the surface coat layers and metal wool layer 18.

The ability of the composite molding tool of the present invention to achieve high thermal and electrical conductivity is accomplished by the use of metal wools in metal wool layers 18, which are continuous strands of wires. The metal wools preferably used in the present invention are made from one or more of steel, aluminum, bronze, stainless steel, and copper. The metallic wool or wire employed is preferably steel wool of from about 0.001 inch to 0.006 inch diameter for a finer wool, and from about 0.0075 inch to 0.0095 inch for a coarser wool. The steel wool is approximately 24 to 26% by weight of the total composition at 100 PSI molding, and is made up of about 99% iron, 0.15% carbon, and 0.80% manganese. In a preferred embodiment, the metallic wool or wire is aluminum of about 0.003 inch to 0.007 inch diameter in fine wool, and from about 0.009 to 0.016 in coarser wool, and is approximately 16 to 18% by weight of the total composition at 100 PSI molding. The metallic wire or wool used in the present invention may be woven or non-woven.

Figure 5:
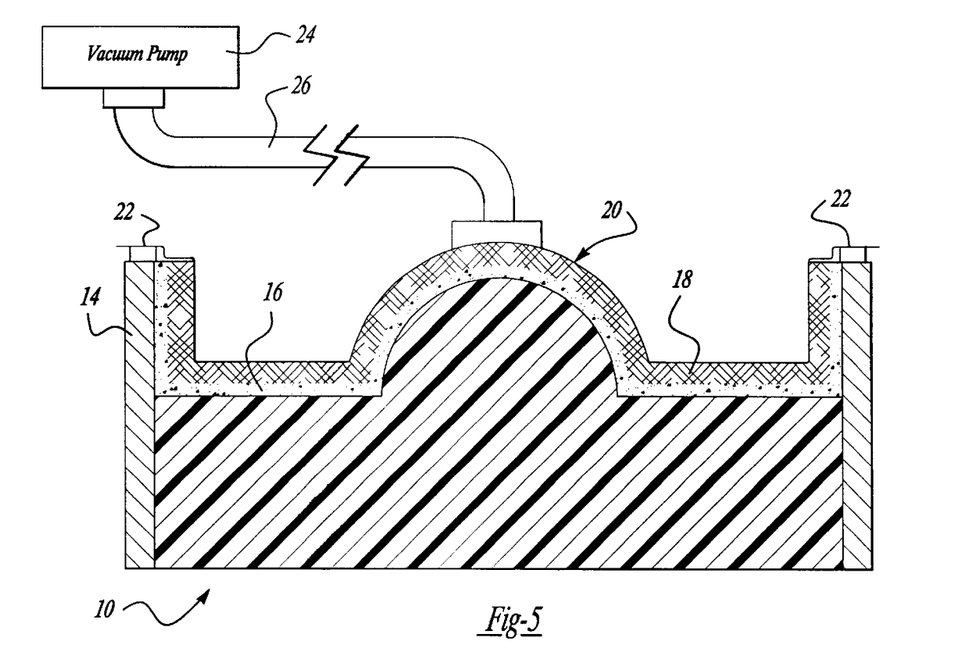
FIG. 5 is the model of FIG. 4 with a vacuum bagging system.

Referring now to FIG. 5, a vacuum bag system is utilized following the application of saturated metal wool layer 18 to model 10. The vacuum bag system removes the air and allows the layers to cure, as air inhibits the curing of the layers. The vacuum bag system is generally applied at about 12 PSI (between about 24–28 inches of mercury, which is equivalent to 11.79 PSI and 13.75 PSI, respectfully) to the reactive saturated metal wool surface layer 18 by first applying a perforated stripper sheet 19 (not shown). Although not required, a woven nylon sheet 21 (not shown) may then be applied to the perforated stripper sheet, followed by an absorbing layer sheet 23 (not shown) to the surface of metal wool layer 18. Perforated stripper sheet 19 is preferably made of polyethylene, which does not stick to any material, and therefore, is a strippable sheet. Stripper sheet 19 allows air and excess resin to pass through the perforations after the vacuum is applied.

Plastic bag 20, as shown in FIG. 5, is then applied to the absorbing or breathing layer sheet 23, and bag 20 is sealed with a sealant adhesive strip 22 around the perimeter of the molding tool. At this point, a vacuum is applied using vacuum pump 24 and vacuum line 26, which is connected to vacuum pump 24 and vacuum bag 20. Vacuum bag systems for forming plastic molds or tools are known generally in the art, such as, for example, U.S. Pat. Nos. 5,302,107, and 5,261,993, incorporated herein by reference.

Air is then evacuated from the space between vacuum bag 20 and resin saturated metal wool layer 18, compressing the wool layer 18 and resin composite layers 16 and 17, and drawing out any air pockets and excess resin from the layers into the absorbing layer 23. This results in a dense composite with a high percentage of metallic content in close proximity having improved thermal conductivity and increased strength. The metallic content of the composite is preferably at least about 45% by weight, and most preferably between about 45 to 90% by weight, with the metallic content being composed of metal wool, powder and particulate fillers. In another preferred embodiment, the metallic content of the composite is preferably about 60 to 80%, and the resin mixture content is about 20–40%. The vacuum system is then left in place on model 10 until the metal wool/resin mixture composite has cured completely at room temperature.

In a preferred embodiment, although not necessary for every tool produced according to the process of the present invention, the model/tool/vacuum system is placed in an adequately sized pressure chamber, such as an autoclave, and sealed. The use of an autoclave allows the molding tool to be further compressed, resulting in a tool having higher density properties and greater structural integrity. In this embodiment, the autoclaving is done before the saturated metal wool layer 18 is fully cured and immediately following the application of the vacuum bag system. The interior pressure of the autoclave is elevated to about 100 PSI+. In some tool applications, it may be necessary to employ even higher pressures. The vacuum system is turned off, however, around 14 PSI, as this is the equivalent of the maximum pressure achievable with the vacuum system. As the autoclave pressure continues to increase up to 100 PSI+, the reactive resin saturated metal wool layer 18 is further compressed, pressing out additional resin and air pockets absorbed by the layers of the vacuum system.

Figure 6:
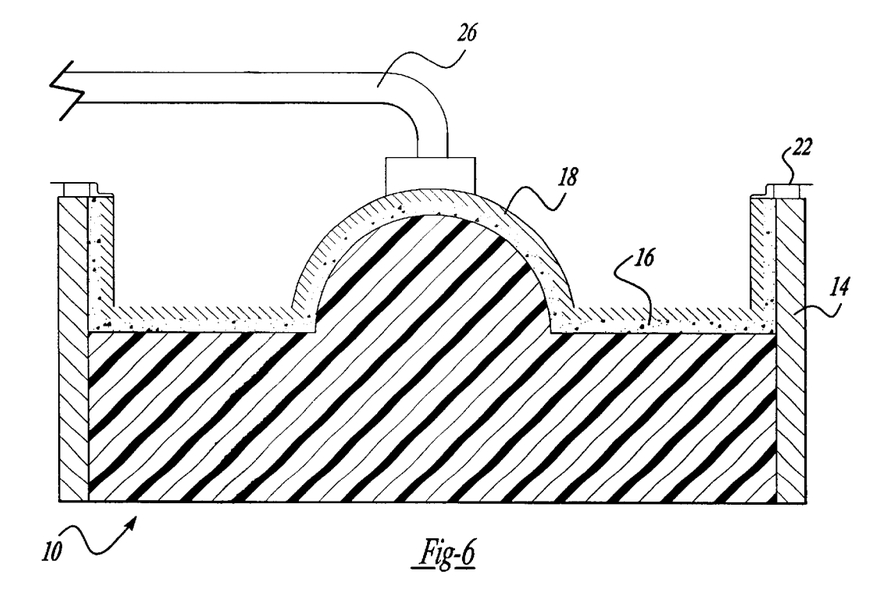
FIG. 6 is the model of FIG. 5 after compressed in an autoclave.

During the autoclaving process, the temperature of the interior of the autoclave may be elevated in some instances to about 350° F. depending on the type of binder resin that is employed. This is to ensure that the binder resin is cured in order to achieve its maximum physical properties. A dense metallic composite is produced having only a minimum of resin needed to bind the metal wool and metal particulates together, as shown in FIG. 6. At this point, the metal to resin content is approximately 10 to 55% of resin mixture to approximately 45 to 90% metal, where the metal content is made up of metal powders, metal particulates, and metal wools, and the resin mixture includes a thermoset resin, promoter, catalyst, inhibitor and in some instances, such as where an iron system is employed, reinforcing fibers. The type of metal wool wire employed for molding tools or molded parts will depend on each application. Aluminum wool provides an increased thermal conductivity as compared to steel wool, but is also more expensive than steel wool.

The use of the vacuum bagging system and the autoclave procedure in the present invention allows for the removal or pressing out of large quantities of the resin mixture, resulting in a composite molding tool having greater strength and higher heat capacity than a similar molding tool that includes the resin. The autoclave step however, is not required for all molding tools, as the vacuum bagging system may provide adequate physical properties for certain tooling applications. If the autoclave procedure is not employed for a tooling application, then the tool may be post-cured either in an oven or by using a molded in-temperature system with copper tubing elevated to the required curing temperatures. The cooling tubes may collect in a manifold, which is coupled by fittings and hoses to a temperature controller. The temperature controller pumps temperature controlled liquid through the molding tool. The system also includes an inlet/outlet coupling. Post-curing provides higher physical properties, resulting in increased cross-linking densities. In some applications, however, post-curing may not be required.

After the compressed resin metal wool layer 18 is cured, vacuum bag 20 and the other bagging sheets 19, 21, and 23 are removed from the tool. In one embodiment of the present invention, the process of forming the molding tool may then include constructing a structural wall or backing, as set forth below.

In one embodiment of the present invention, the fully reacted tooling layer may then be abraded to provide a mechanical bonding surface for the subsequent tooling layers.

Figure 7:
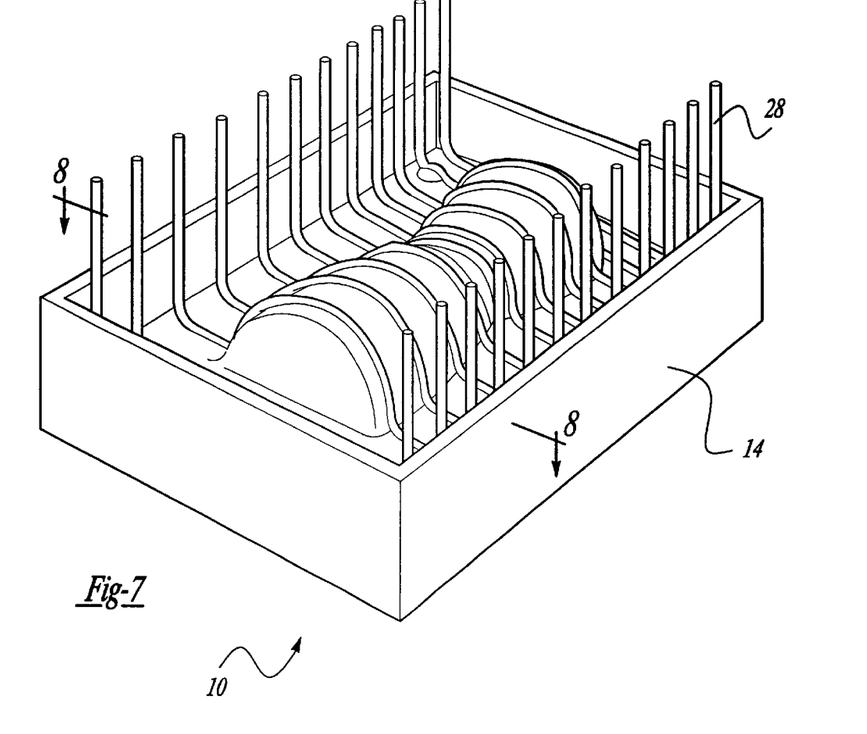
FIG. 7 is a perspective view of the model of the present invention with a temperature controlling system.
Figure 8:
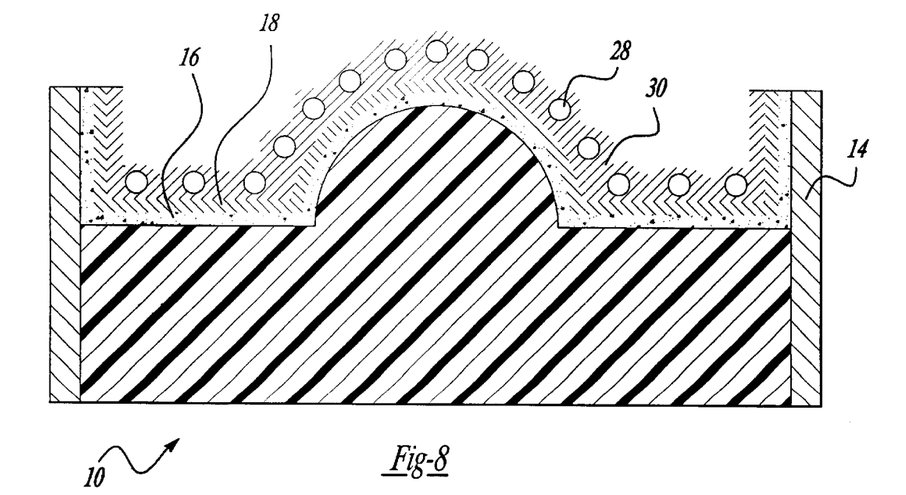
FIG. 8 is a cross-section view of the model of FIG. 7 with a layer of conductive aluminum slurry mixture.

Referring now to FIGS. 7 and 8, a temperature controlling system 28, preferably made of copper tubing, is bent to conform to the back surface of the tool in generally parallel lines at specified distances apart. These tubes in one embodiment of the invention are preferably made of an outer diameter of ⅜ inch of copper tubing, but may also be ½ and ¼ inch. The parallel lines of tubing may be looped together with soldered joints or may be soldered to a manifold. Temperature control hoses are then attached to the copper manifold or a coolant inlet/outlet fitting, and also to a commercially available temperature controlling device. It is preferred that the copper tubing system 28 be bent and fitted so that the tubing is in contact with the back of the layer of resin mixture and metal wool that has been vacuum bagged in order to provide improved conductivity.

A layer of a mixture of conductive aluminum slurry (CAS) 30 is then applied over copper tubes 28, fully covering the tubes and securing the tubes to the back surface. CAS is composed of aluminum powders and resin. The preferred resin employed is non-styrenated vinyl ester. In one embodiment, the resulting compressed composite molding tool preferably has a density of about 140 to 225 pounds per cubic feet at 100 PSI for an iron system, and about 90 to 100 pounds per cubic feet at 12 PSI for an aluminum system.

In an alternative embodiment, the copper tubing is tacked in place to the back surface using a mixture of resin, aluminum powder, and glass fiber. With the copper tubing in place, strips of metal wool saturated in the resin mixture are applied over metal tubing system 28 such that the strips enclose each copper tubing line in order to eliminate air pockets. An additional metal wool layer saturated in a resin mixture of thermoset resin, promoter, inhibitor, metal particulate, metal powders, glass fibers, and a catalyst may then be applied over the tool back surface in the wool-covered copper tubing 28. A vacuum bagging system may then again be applied if necessary in the same manner, where a vacuum bag is attached to metal wool layer and sealed around the perimeter of the tool. Upon application of the vacuum to the tool, the metal wool layer, which is saturated in the above-mentioned resin mixture is compressed, drawing out excess resin and resulting in a metallic layer which encloses and is in metallic contact with the tubing of copper tubing system 28. At this point, the autoclave procedure previously described may again be applied to the tooling system if required to achieve the desired thermal conductivity from within the tool.

Although the cooling tubes are not necessary for every molding tool, a tool may act as a heat sink without the tubes, increasing in temperature with each molding cycle, and reducing the tool's life and increasing cycling times.

Figure 13:
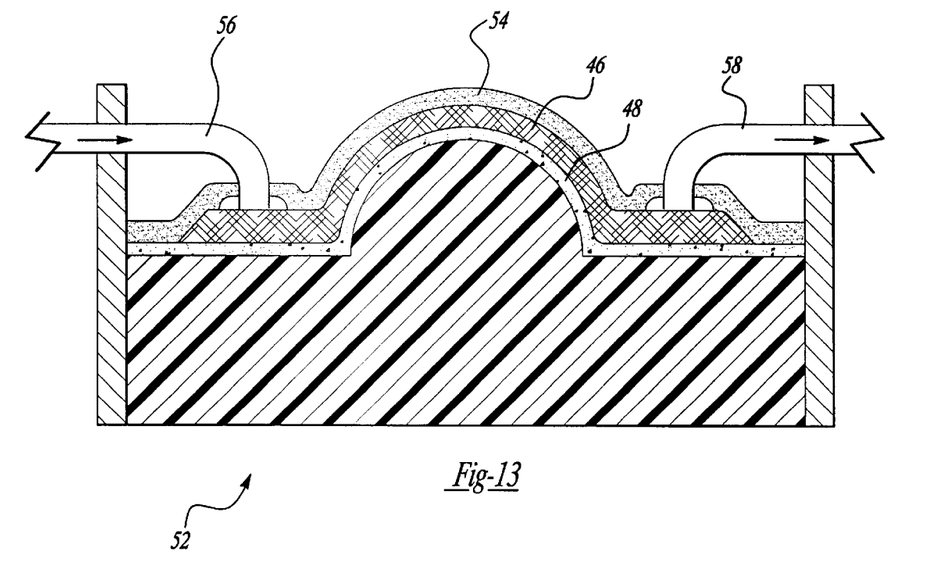
FIG. 13 is a cross-section view of a molding tool having a structural water jacket.

In an alternative embodiment, the use of cooling tubes may be eliminated by employing a structural water jacket 46, as shown in FIG. 13. Structural water jacket 46 is a porous manifold or substrate made up of resin and metallic material. The porous substrate material is conductive, maintaining a uniform temperature over the tool surface, and will not corrode in water. The metallic particles of the substrate material also fit together so that they have uniform spaces in between particles to allow for even flow and uniform heat distribution. The resin employed may be, but is not limited to, non-styrenated vinyl ester or epoxy, and the metallic material may be, for example, aluminum shot ($\frac{1}{16}$ to $\frac{1}{4}$ inch diameter) or stainless steel ball bearings ($\frac{1}{16}$ to $\frac{1}{4}$ inch diameter).

First, a layer of resin saturated metal wool 48, like that of metal wool layer 18, is applied to a model 52 and vacuum bagged according to the same procedure set forth herein. Next, structural water jacket 46 is applied to layer 48. In a preferred embodiment, a layer of conductive aluminum slurry mixture 50 (not shown) is added to structural water jacket 46 in order to prevent the resin mixture from being squeezed out of the wool into the voids of the porous substrate. Finally, a second layer 54 of resin saturated metal wool is applied to structural water jacket 46 and vacuum bagged according to the same procedure set forth herein.

Cooling tubes 56 and 58 are then placed at each end of the tool, as shown in FIG. 13. The structural water jacket withstands the required molding pressures, while providing an even distribution of heat throughout the molding tool.

Figure 9:
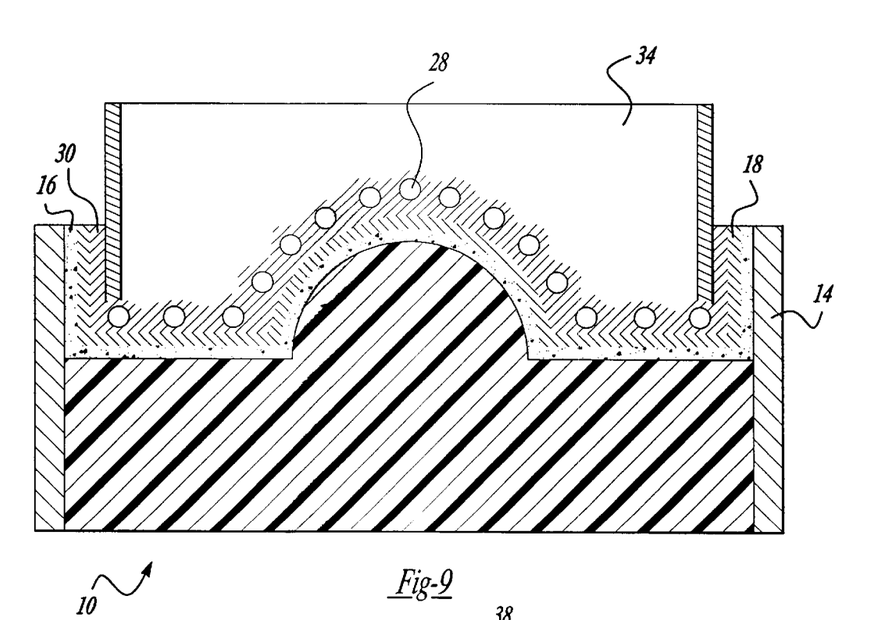
FIG. 9 is the model of FIG. 8 with a chase.

A welded metal or bonded or bolted wood chase or casing 34, a four-sided perimeter wall, is then attached to the back layer of the tool, as shown in FIG. 9. Chase 34 provides a structural wall for the tool and is attached to, and parallel to, the return flanges 14 composed of the compressed metallic wool and resin mixture. The space within the perimeter of chase 34 is then egg-crated with metal or wood walls 36 to the required pre-designed centers, where the eggcrating walls 36 preferably have two inch diameter holes 38 approximately every six inches of the vertical eggcrate wall 36 and at the center line of each interior eggcrate wall 36.

Figure 10:
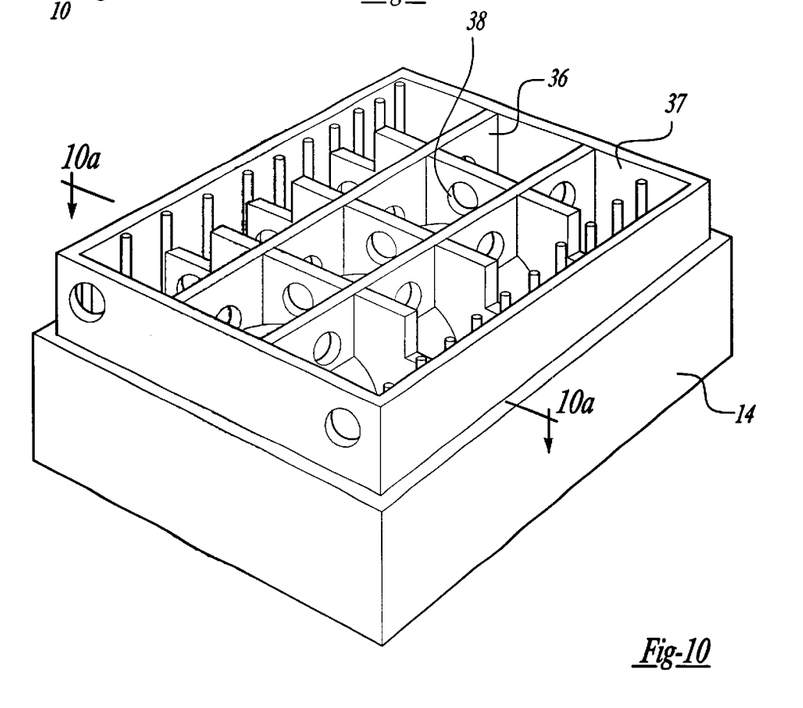
FIG. 10 is a perspective view of the model of the present invention with a chase having eggcrating.
Figure 10A:
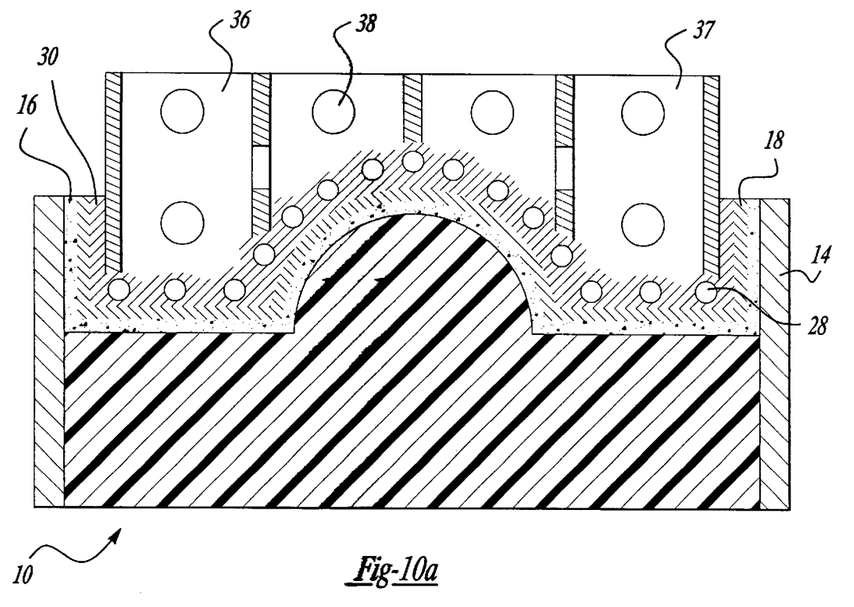
FIG. 10a is a cross-section view of the model of FIG. 10.

Eggcrate wall 36 is preferably welded or bonded in place as shown in FIGS. 10 and 10a to define a plurality of cubicles 37. If the eggcrate walls are metal, the walls are welded to each other, and if the walls are wood, they are bonded together using a resin and filler mix and glass cloth at the juncture of the walls. A tool of the present invention may also be constructed by using a welded metal tube structure in place of a chase.

Figure 11:
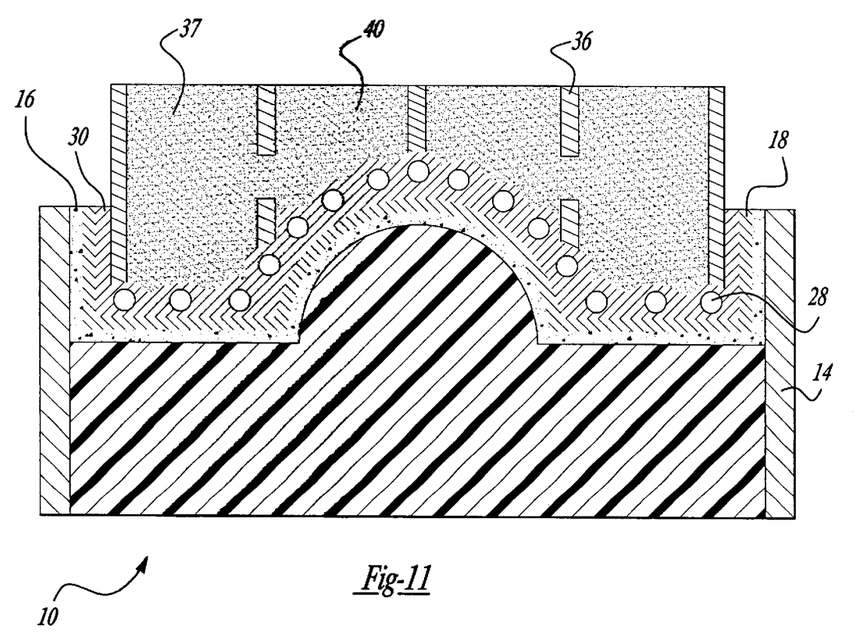
FIG. 11 is the model of FIG. 10a filled with a resin/filler mixture.
Figure 12:
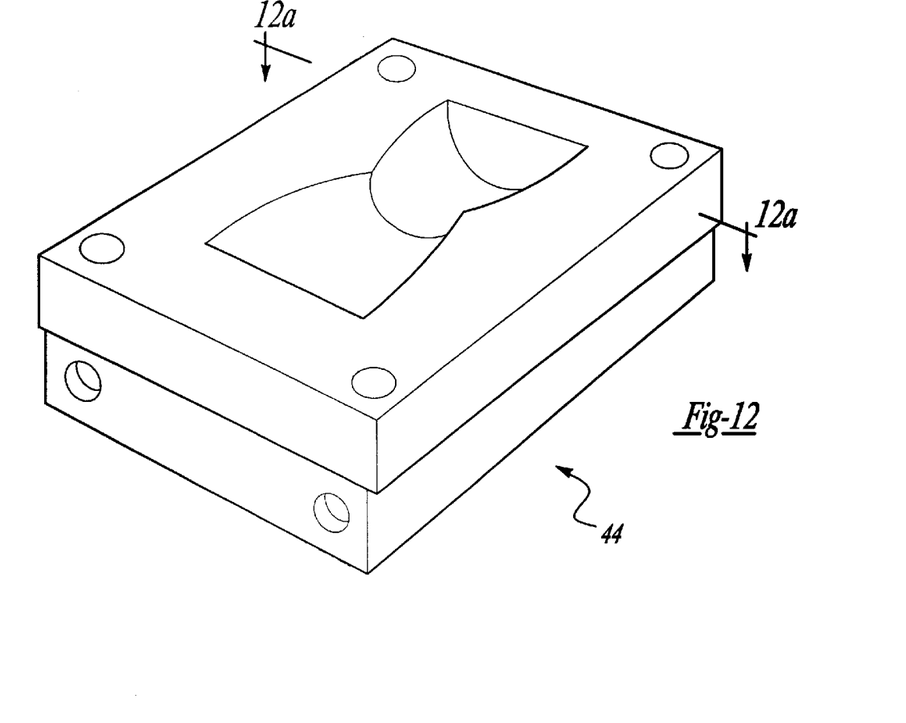
FIG. 12 is a perspective view of one half of a finished tool.
Figure 12A:
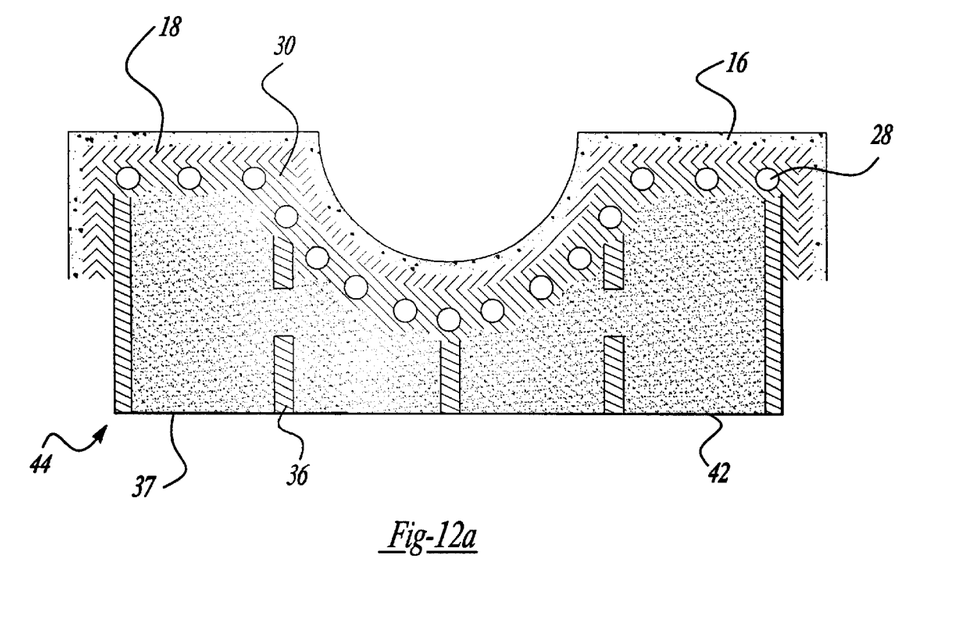
FIG. 12a is a cross-section view of FIG. 12.

Chase 34 is then filled with resin/filler mixture 40, which is preferably made up of a combination of fillers including, but not limited to, silica sand, glass fiber, aluminum pellets, cut aluminum wire, expanded lava rock pellets, expanded shale, grout or cement. Mixture 40 also includes a promotor and catalyst. Referring to FIGS. 10, 10a, and 11, holes 38 in the eggcrating walls 36 are filled with resin/filler mixture 40, such that the mixture flows through all-of the two inch diameter holes 38 in the vertical walls of chase 34 in order to lock each eggcrated cubicle 37 of filler to the other. Upon curing and hardening, the eggcrated cubicles 37 function as a structural tooling backing. Filled tool back 42, as shown in FIGS. 12 and 12a, is then preferably machined in order to provide a flat and parallel back surface for mounting to the molding machine platen, resulting in one half 44 of the molding tool.

In order to produce the corresponding tool half, run-off portion 12 is removed and the process steps set forth herein are repeated, presuming both halves are of identical size and shape. In one embodiment where a large single thickness part is to be produced from the tool, an adhesive-backed wax sheet of specified part thickness is applied to the cavity of the tool after model 10 and run-off 12 are removed. This, then, represents the part model for the second or corresponding half of the tool.

Figure 14:
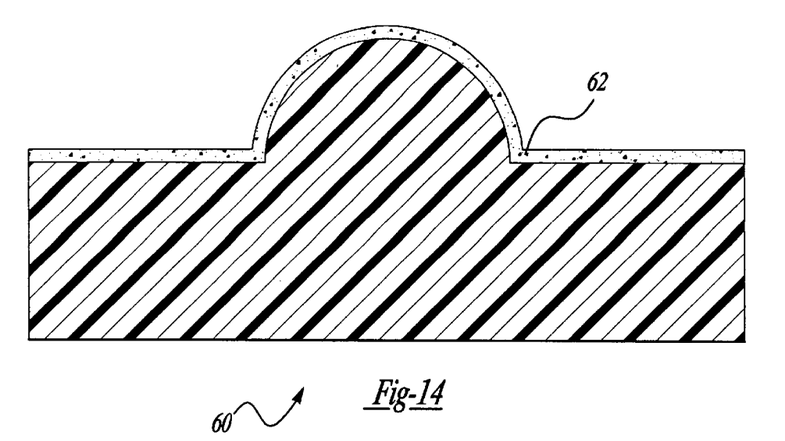
FIG. 14 is a cross-section view of an alternative embodiment model of the present invention.
Figure 15:
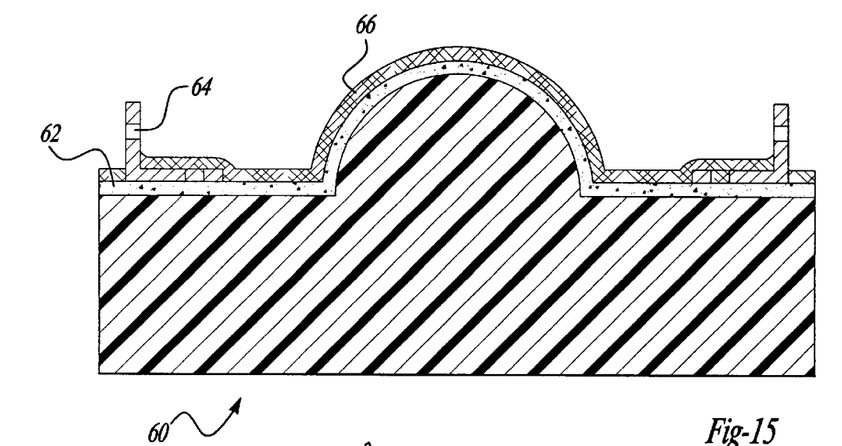
FIG. 15 is the model of FIG. 14 with a steel angle.
Figure 16:
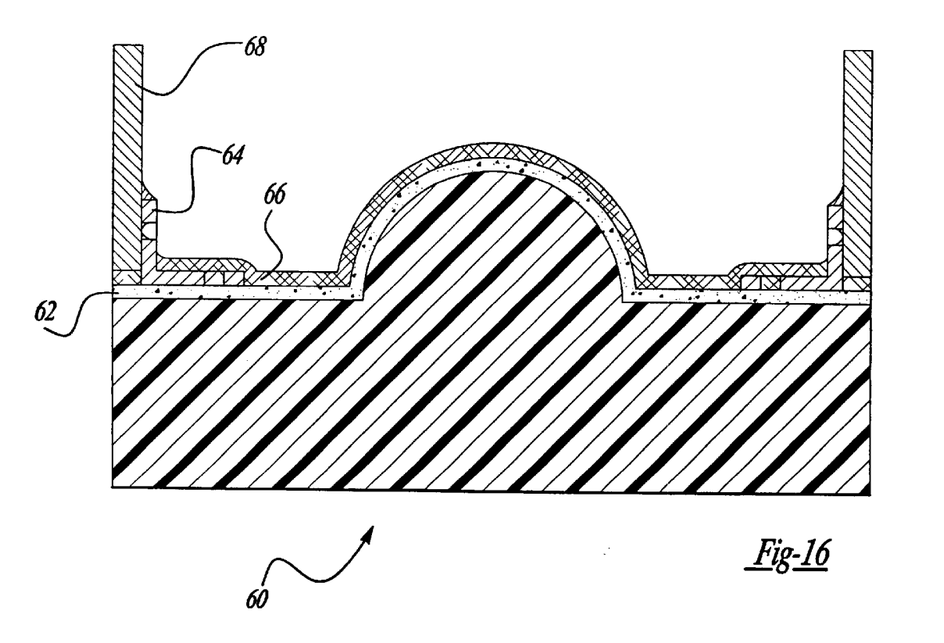
FIG. 16 is the model of FIG. 15 with a steel plate.
Figure 16A:
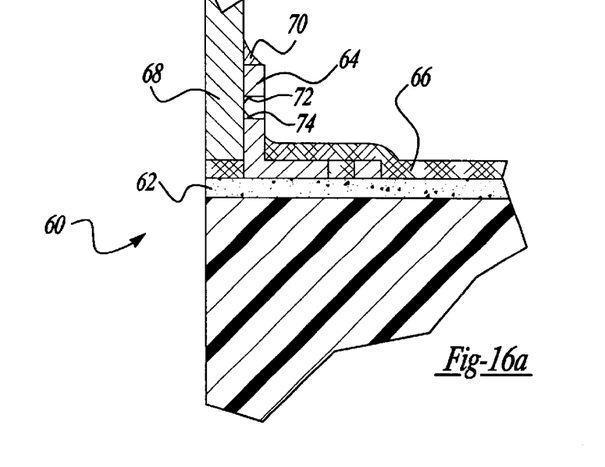
FIGS. 16A and 16B are exploded views of the steel angle and steel plate.

Referring now to FIG. 14, in a preferred embodiment of the present invention, a model 60 may alternatively be employed to form a composite molding tool. In this embodiment, a first layer 62 of a resin saturated metal wool layer like that of layer 18 set forth herein is applied to the surface of model 60. Layer 62 is then vacuum bagged according to the procedures set forth above. A steel angle 64 is then placed on top of layer 62, as shown in FIGS. 15 and 16. As indicated in FIG. 16A, holes may be created along steel angle 64. A second layer 66 of resin saturated metal wool layer is then applied to steel angle 64 and vacuum bagged. The holes in the angle allow second layer 66 to bond steel angle 64 to first layer 62, as the composite material seeps through the holes in the angle and secures the angle to the first layer. Alternatively, as shown in FIG. 16B, the steel angle may be employed without the use of holes.

Figure 16B:
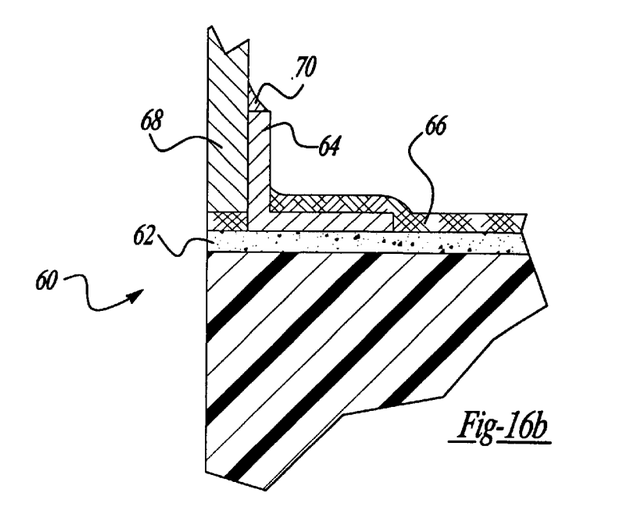
Figure 17:
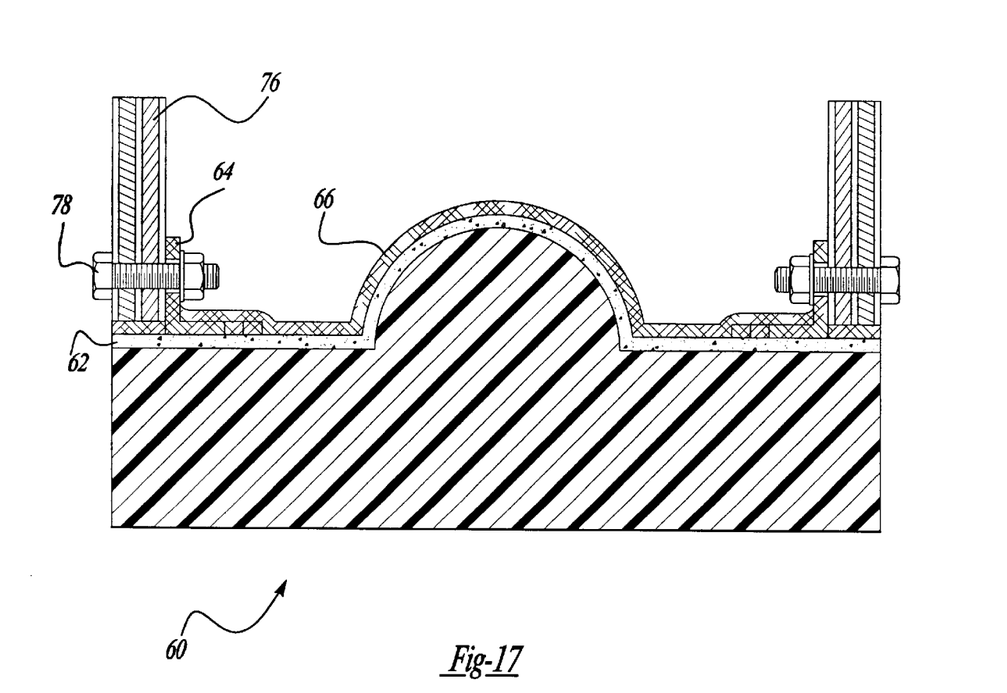
FIG. 17 is the model of FIG. 15 with a vertical wooden plate.

A steel plate 68 is next welded to steel angle 64 at point 70, as shown in FIG. 16B, and at points 70, 72, and 74 as shown in FIG. 16A. In order to complete the molding tool, cooling lines and welded rods or eggcrating and filler are then applied to model 60 as set forth herein. The use of steel plate 68 is required only for high load applications, such as compression molding or injection molding. In a further alternative embodiment, a wooden plate 76 may be bolted to steel angle 64 with bolt 78, as shown in FIG. 17. In this embodiment, cooling lines and eggcrating and filler are then also applied.

The models employed to produce the molding tools of the present invention may be large wood forms machined to shape or small models produced with rapid prototyping systems, such as Fused Deposition Molding (FDM), which produces thermoplastic models or Stereo Lithography (SLA), which produces thermoset models from computer generated surface data.

In an alternate embodiment of the present invention, the metal wool may be prepregged or impregnated with a thermoset resin, such as a non-styrenated vinyl ester resin. This is similar to prepreg for sheet molding composition where a resin, filler, promoter, and catalyst are impregnated into a carbon glass fiber matrix. The use of prepregged material allows for increased shelf life as long as it is kept cold in order to avoid reaction between the components.

The present invention composite molding tool may be employed in molding processes such as, but not limited to, reaction injection molding (RIM), resin transfer molding (RTM), compression molding, sheet molding compound molding, injection molding, vacuum forming, thermoforming, expanded plastic bead process, rotational molding, slush molding, and blow molding. Blow molding processes are commonly used in the art to make parts, such as gas tanks and spoilers for automobiles, toys, and packaging.

EXAMPLES

Example 1

Preparation of Resin Mixtures

FORMULATION

The resin employed below is a non-styrenated vinyl ester (VESTALLOY®, Lenox Resources Ltd.). Each formulation includes cobalt as a promoter. The level of cobalt will vary depending upon the formulation. Cobalt is added until the gel time is adjusted to its desired time. Cumene hydro peroxide (CHP) is a catalyst employed in each formulation of thermoset resin with short gel times, while Mekp Hipoint 90 is used with thermoset resins with long gel times. Approximately 1.25 parts of CHP or Mekp Hipoint 90 is used to catalyze 100 parts of neat resin. Each formulation includes p-tert-butylcatechol (TBC) as an inhibitor. Approximately 0.2 to 0.3% of inhibitor solution (25% solvent and 75% TBC powder) is added to a formulation with a resin having a long gel time. Approximately 0.05 to 0.1% of inhibitor solution is added to a formulation with a resin having a short gel time.

| Surface Coat | | Surface Coat | |
|---|---|---|---|
| Resin - Fast | 27.5% | Resin - Slow | 27.5% |
| AC-325 (iron powder) | 37.0% | AC-325 | 37.0% |
| Ampal 611 (aluminum powder) | 15.0% | Ampal 611 | 15.0% |
| BS-91 (barium sulfate) | 19.0% | BS-91 | 19.0% |
| GM-175 (graphite powder) | 1.5% | GM-175 | 1.5% |
| *22–25 minute resin | | *160–200 minute resin | |

| Molybdenum Surface Coat | |
|---|---|
| Resin - Lam 2225 | 30.5% |
| CSM WMPF-1(-220 mesh) (Mo powder) | 67.5% |
| GM-175 | 2.0% |

| Iron SLC | | Aluminum SLC | |
|---|---|---|---|
| Resin | 32.0% | Resin | 45.0% |
| AC-325 | 66.0% | Ampal 611 | 55% |
| Glass Fiber 1/32" | 2.0% | *160–200 minute resin | |
| *160–200 minute resin | | | |

| Eggcrate Bonding Material | | Backfill Slurry | |
|---|---|---|---|
| Resin | 65.0% | Resin 40.5 min. | 13.0% |
| Glass Fiber 1/16" | 32.0% | Glass Fiber 1/4" | 4.0% |
| Cab-o-sil | 3.0% | Coarse Sand | 83.0% |
| *40–50 minute resin | | *160–200 minute resin | |

Mix the materials of each formulation in an enclosed reactor so that there are no airborne particles. It is also possible to use a drill and a large jiffy mixer. First pour the resin in the mixing vessel. The resin should already be promoted to the desired gel time. The lighter materials should then be mixed into the solution. Next, add the barium sulfate in order to allow the barium to decomglomerate while the resin is thin. The metal particles should be added last. Once all the materials are in the solution, check to see that the mixture is homogenous. Do not over-mix each mixture to avoid elevating the temperature of the resin.

Example 2

Process for Forming a Composite Molding Tool

1. Cut pieces of steel metallic wool to fit the surface of a wooden model, roll up or fold the pieces and weigh them.

2. Apply about 0.001 to 0.002 inches of polyvinyl alcohol (Partall film No. 10, Rexco) to the surface of the wooden model. Next apply a layer of paste wax (Johnson paste wax, S. C. Johnson Wax) and buff thoroughly after the polyvinyl alcohol has dried and before the application of the first layer of surface coat.

3. After all of the wax is thoroughly buffed, apply approximately 0.035 inches of the fast surface coat mixture prepared in Example 1 to the surface of the model, producing a surface coat. Apply a second fast surface coat layer. Then apply a slow surface coat mixture prepared in Example 1 to produce a third layer.

4. Saturate all of the pieces of metallic wool with the Iron SLC resin mixture as described in Example 1, and fit the pieces to the surface coated model.

5. Apply a vacuum bagging system to the model by first applying a perforated stripper sheet to the layer of saturated wool. Next, apply an absorbing layer to the stripper sheet, and then apply a plastic bag layer to the absorbing layer and around the perimeter of the mold. Attach an air evacuation hose to the system and a vacuum pump.

6. Place the entire model/tool/vacuum system in an autoclave and seal. The autoclave may be just big enough to encompass the model. Elevate the interior pressure of the autoclave to 100 PSI+. Turn off vacuum system at 14 PSI.

7. Remove vacuum bagging sheets.

8. Abrade the back surface of the molding tool.

9. Apply copper tubes to the back surface (3/8 and 1/4 inches in diameter), bending and fitting the tubing so that the tubing is in contact with the back layer of the tool.

10. Attach the tubing in place with a mixture of the conductive aluminum slurry (CAS) as described in Example 1, fully covering the tubes.

11. A wood chase is then bonded to the back of the tool surface with a resin glass fiber mixture (33.3% of 1/16 inch glass fiber and 66.7% resin) and Cab-o-sil. Next, eggcrate the wood chase. The eggcrate is made out of plywood and about 2 inch holes are drilled towards the bottom of the eggcrate to help disperse the load of material throughout the backfill.

12. Fill the entire back surface of the tool with a backfill slurry mixture including non-styrenated vinyl ester, cobalt, CHP catalyst, glass fiber, grout, cement, and coarse sand, as described in Example 1 (Backfill Slurry).

13. Machine the filled tool back for mounting to the molding machine platen.

The invention has been described in detail with reference to preferred embodiments thereof. It should be understood, however, that variations and modifications can be made within the spirit and scope of the invention.

What is claimed is:

1. A process of forming composite molding tools comprising the steps of:

(a) applying at least one layer of a surface coat mixture to a model, producing a surface coat;

(b) applying at least one layer of metal wool saturated in a resin coating mixture to said surface coat, producing a metal wool/resin mixture layer; and (c) applying a vacuum bag system to said metal wool/resin mixture layer, compressing said layer and drawing out excess resin mixture.

2. A process according to claim 1 further comprising the steps of:

(a) attaching a temperature controlling system to said metal wool/resin mixture layer; and (b) applying a layer of a conductive aluminum slurry mixture over said temperature controlling system.

3. A process according to claim 2 further comprising the steps of:

(a) constructing and bonding a chase to a back surface of said molding tool, wherein said chase includes eggcrates within the perimeter of said chase; and (b) filling said back surface and eggcrates with a resin mixture, resulting in one half of said composite molding tool.

4. A process according to claim 1 wherein said surface coat mixture layer comprises a thermoset resin selected from the group consisting of vinyl esters, non-styrenated vinyl esters, epoxies, polyurethanes, polyesters, silicone RTV, and mixtures thereof; a promoter; a catalyst; an inhibitor; metal powder fillers; and mineral fillers.

5. A process according to claim 1 wherein said resin coating mixture comprises a thermoset resin selected from the group consisting of vinyl esters, non-styrenated vinyl esters, epoxies, polyurethanes, polyesters, silicone RTV, and mixtures thereof; a promoter; a catalyst; an inhibitor; and metal powder fillers.

6. A process according to claim 1 wherein said surface coat layer of step (a) comprises about 60% to about 90% by weight of metallic fillers.

7. A process according to claim 1 wherein said metal wool of step (b) is selected from the group consisting of steel, aluminum, bronze, copper, stainless steel; and mixtures thereof.

8. A process according to claim 1 wherein step (c) further includes applying a perforated stripper sheet to said saturated metal wool layer, applying an absorbing layer sheet to said stripper sheet, applying a plastic bag layer to said absorbing layer sheet, sealing a vacuum bag layer around the perimeter of said molding tool, and attaching an air evacuation hose to a vacuum pump and said system.

9. A process according to claim 1 further comprising the step of placing said composite molding tool in a pressure chamber after step (c), applying pressure and further compressing said wool/resin mixture layer.

10. A process of forming composite molding tools comprising the steps of.
   (a) providing a model having a surface for forming said composite molding tools;
   (b) applying a surface coat mixture layer to said model, producing a surface coat;
   (c) applying a second surface coat mixture layer to said surface coat;
   (d) applying at least one layer of metal wool saturated in a resin coating mixture to said second layer of said surface coat, producing a metal wool/resin mixture layer;
   (e) applying a vacuum bag system to said metal wool/resin mixture layer;
   (f) compressing said metal wool/resin mixture layer and drawing out excess resin mixture;
   (g) placing said composite molding tool in an autoclave, applying pressure and further compressing said wool/resin mixture layer;
   (h) removing said vacuum bag system, exposing a back surface of said molding tool;
   (i) fitting a copper tubing system to said back surface;
   (j) applying at least one layer of a conductive aluminum slurry mixture to said copper tubing system;
   (k) constructing and attaching a chase to said back surface, wherein said chase includes eggcrates within the perimeter of said chase; and
   (l) filling said back surface and eggcrates with a resin mixture, resulting in one half of said composite molding tool;
   wherein a second half of said composite molding tool is constructed by repeating steps (a)–(l).

11. A process according to claim 10 further comprising the step of increasing the interior pressure of said autoclave in step (g) to about 100 PSI to further compress said metal wool/resin mixture layer and draw out excess resin mixture.

12. A process according to claim 10 further comprising the step of attaching a steel angle to said metal wool/resin mixture layer.

13. A process according to claim 10 further comprising the step of machining said one half of said molding tool to provide a flat and parallel back surface for mounting said molding tool.

* * * * *